United States Patent
Chen et al.

(10) Patent No.: US 12,267,269 B2
(45) Date of Patent: Apr. 1, 2025

(54) CONFIGURATION FOR REFERENCE SIGNALING IN WIRELESS COMMUNICATION SYSTEMS

(71) Applicant: ZTE Corporation, Guangdong (CN)

(72) Inventors: Mengzhu Chen, Guangdong (CN); Yuzhou Hu, Guangdong (CN); Jun Xu, Guangdong (CN); Qiujin Guo, Guangdong (CN); Xiaoying Ma, Guangdong (CN)

(73) Assignee: ZTE Corporation, Guangdong (CN)

( * ) Notice: Subject to any disclaimer, the term of this patent is extended or adjusted under 35 U.S.C. 154(b) by 338 days.

(21) Appl. No.: 17/886,963

(22) Filed: Aug. 12, 2022

(65) Prior Publication Data

US 2023/0032593 A1    Feb. 2, 2023

Related U.S. Application Data

(63) Continuation of application No. PCT/CN2020/075374, filed on Feb. 14, 2020.

(51) Int. Cl.
*H04L 5/00* (2006.01)
*H04W 56/00* (2009.01)
(Continued)

(52) U.S. Cl.
CPC ......... *H04L 5/0051* (2013.01); *H04W 56/001* (2013.01); *H04W 68/005* (2013.01); *H04W 76/20* (2018.02)

(58) Field of Classification Search
CPC . H04L 5/0051; H04L 27/2613; H04L 5/0048; H04L 5/0053; H04L 5/0082;
(Continued)

(56) References Cited

U.S. PATENT DOCUMENTS

2015/0092691 A1* 4/2015 Hwang ................. H04L 5/0048
370/329
2017/0208568 A1   7/2017 Nam et al.
(Continued)

FOREIGN PATENT DOCUMENTS

CN   108023705 A   5/2018
CN   108496319 A   9/2018
(Continued)

OTHER PUBLICATIONS

Rospatent, Decision to Grant for Russian Application No. 2022124137, mailed on Oct. 2, 2023, 14 pages with unofficial translation.
(Continued)

*Primary Examiner* — Chae S Lee
(74) *Attorney, Agent, or Firm* — Perkins Coie LLP

(57) ABSTRACT

Methods, systems, and devices for configurations for reference signaling in mobile communication technology are described. An example method for wireless communication includes transmitting, by a network node to a wireless device, a first signaling comprising information associated with a first reference signal, the information comprising at least one of a configuration of the first reference signal, an update information of the first reference signal, or a valid period of the first reference signal.

12 Claims, 12 Drawing Sheets

(51) Int. Cl.
*H04W 68/00* (2009.01)
*H04W 76/20* (2018.01)

(58) Field of Classification Search
CPC . H04W 56/001; H04W 68/005; H04W 76/20; H04W 76/27; H04W 76/28; H04W 72/232; H04W 24/08; H04W 48/10; H04W 72/0446; H04W 72/0453; Y02D 30/70
See application file for complete search history.

(56) References Cited

U.S. PATENT DOCUMENTS

| | | | |
|---|---|---|---|
| 2019/0007897 A1 | 1/2019 | Ng et al. | |
| 2019/0349116 A1* | 11/2019 | Hosseini | H04L 1/0011 |
| 2021/0127450 A1* | 4/2021 | Abdoli | H04W 52/0216 |
| 2021/0153162 A1* | 5/2021 | Chen | H04W 56/001 |
| 2023/0412228 A1* | 12/2023 | Nam | H04W 76/11 |

FOREIGN PATENT DOCUMENTS

| | | |
|---|---|---|
| CN | 109587819 | 4/2019 |
| CN | 110035447 A | 7/2019 |
| CN | 110035567 | 7/2019 |
| CN | 110035567 A | 7/2019 |
| CN | 110072285 A | 7/2019 |
| CN | 110226351 A | 9/2019 |
| CN | 110690947 | 1/2020 |
| CN | 110690947 A | 1/2020 |
| RU | 2713652 C1 | 2/2020 |
| WO | 2016/191091 | 12/2016 |
| WO | 2018/232751 | 12/2018 |
| WO | 2019/029452 | 2/2019 |
| WO | 2019/029711 | 2/2019 |
| WO | 2019028849 A1 | 2/2019 |
| WO | 2019/137424 | 7/2019 |
| WO | 2019/193411 | 10/2019 |

OTHER PUBLICATIONS

Extended European Search Report for co-pending EP Application No. 20890363.3, dated Oct. 9, 2023, 9 pages.
Spreadtrum Communications "Remaining issues on TRS" 3GPP TSG RAN WG1 Meeting 90bis Prague, CZ, Oct. 9-13, 2017, R1-1717747, 6 Pages.
First Examination Report for co-pending India Application No. 202247046786, dated Dec. 19, 2022, 7 pages.
Official Action and Search Report for co-pending Russian Application No. 2022124137, dated Jun. 21, 2023, 13 pages with unofficial translation/summary.
CNIPA, First Office Action for Chinese Application No. 202310212176. 2, mailed on Aug. 23, 2023, 12 pages with unofficial translation.
MediaTek Inc., "Rel-17 UE Power Saving: Summary of Email Discussion," 3GPP TSG RAN #86, Sitges, Spain, RP-193089, Dec. 9-12, 2019, 28 pages.
CNIPA, Notice of Grant and Search Report for Chinese Application No. 202310212176.2, mailed on May 13, 2024, 6 pages with machine translation.
CNIPA, Second Office Action for Chinese Application No. 202310212176.2, mailed on Dec. 19, 2023, 8 pages with unofficial English summary.
International Search Report and Written Opinion for International Application No. PCT/CN2020/075374, mailed on Oct. 13, 2020 (7 pages).
Office Action for Japanese Application No. 2022-549160, mailed on Mar. 1, 2024, 10 pages with machine translation.
Hearing Notice for co-pending India Application No. 202247046786, dated Jan. 9, 2025, 3 pages.
Article 94 Communication for co-pending EP Application No. 20890363.3, dated Oct. 22, 2024, 5 pages.

\* cited by examiner

CONFIGURATION FOR REFERENCE SIGNALING IN WIRELESS COMMUNICATION SYSTEMS

CROSS-REFERENCE TO RELATED APPLICATIONS

This application is a continuation of International Patent Application No. PCT/CN2020/075374, filed on Feb. 14, 2020, the contents of which are incorporated herein by reference in their entirety.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for an increased number of users and devices, which operate in a power-cognizant manner.

SUMMARY

This document relates to methods, systems, and devices for configurations for reference signaling in mobile communication technology, including 5th Generation (5G) communication systems.

In one exemplary aspect, a wireless communication method is disclosed. The method includes transmitting, by a network node to a wireless device, a first signaling comprising information associated with a first reference signal, wherein the information comprises at least one of a configuration of the first reference signal, an update information of the first reference signal, or a valid period of the first reference signal.

In another exemplary aspect, a wireless communication method is disclosed. The method includes receiving, from a network node by a wireless device, a first signaling comprising information associated with a first reference signal, wherein the information comprises at least one of a configuration of the first reference signal, an update information of the first reference signal, or a valid period of the first reference signal.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
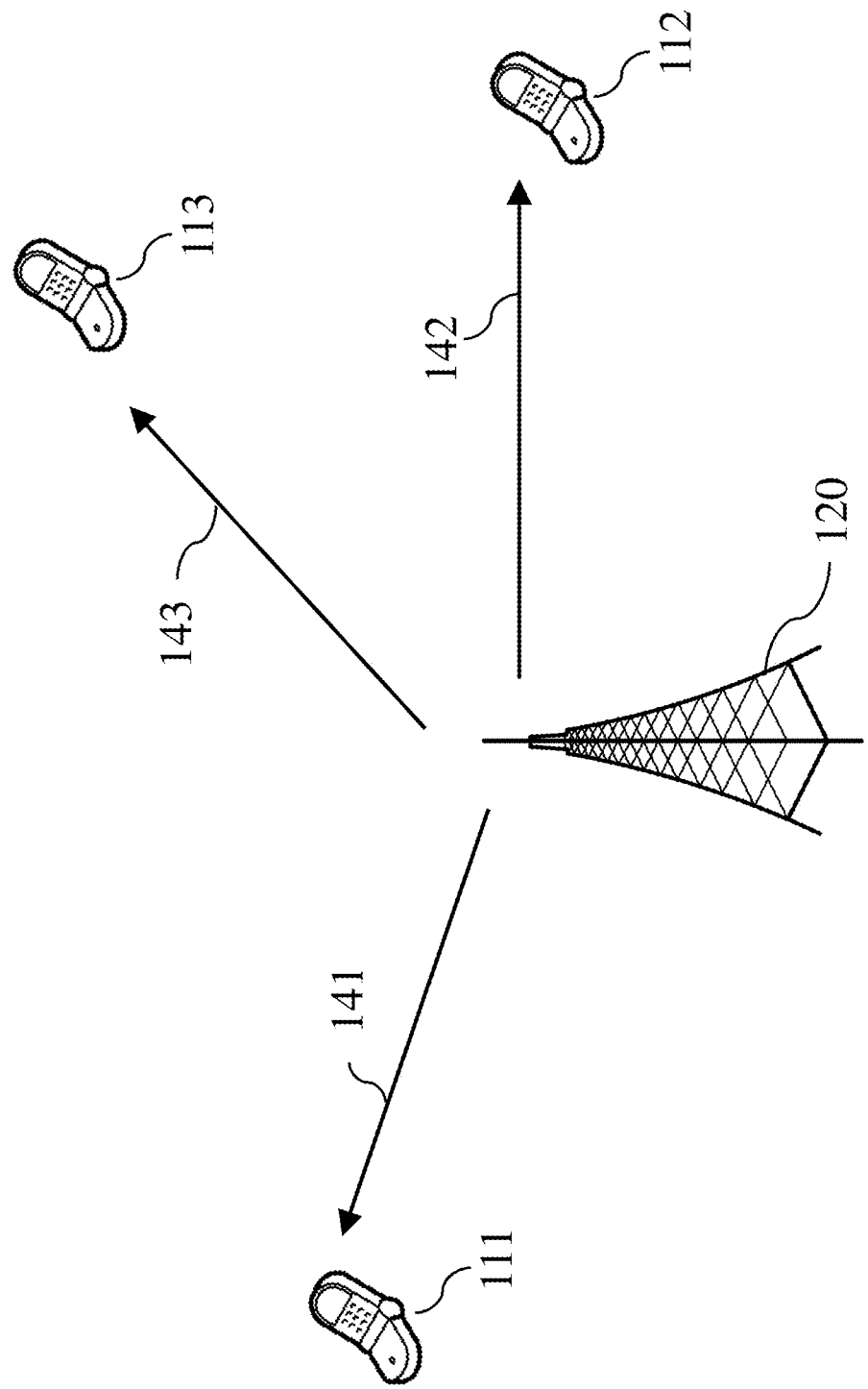
FIG. 1 shows an example of a base station (BS) and user equipment (UE) in wireless communication, in accordance with some embodiments of the presently disclosed technology.

Upcoming 5G New Radio (NR) systems promise significantly improved system throughput and service quality. However, many of the gains come at the expense of complexity in the user equipment (UE), which results in increased power consumption at the UE.

In an example, in Long Term Evolution (LTE) systems, a cell-specific reference signal (CRS) can be used for an idle mode UE for Automatic Gain Control (AGC) tracking, Radio Resource Management (RRM) measurements, paging reception, time and/or frequency tracking, etc. These operations, in NR systems, rely on the Synchronization Signal/PBCH Block (SSB). However, the periodicity of the SSB (in NR) is much sparser than CRS (in LTE).

Furthermore, there is typically a gap between the SSB and a Paging Occasion (PO) in the time-domain. In this case, the UE needs to wake up multiple times to detect the SSB, or the PDCCH monitoring occasions of the PO, which is power consuming.

More generally, reference signal configuration is one of the primary contributors of power consumption for UEs in the radio resource control (RRC) idle mode or RRC inactive mode. Embodiments of the disclosed technology provide methods, devices and systems for reducing the power consumption of the UE in RRC idle mode, RRC inactive mode and RRC connected mode.

In some embodiments, reducing the power consumption of UE in RRC idle, RRC inactive and RRC connected modes may achieved by providing other reference signals, in addition to the SSB. While also considering the resource overhead and the network power efficiency, in an example, the reference signals for a RRC connected mode UE is used for RRC idle mode and RRC inactive mode UEs. Furthermore, these methods require no additional reference signal transmission on the network side, thereby ensuring that the network-side power efficiency is not significantly decreased.

In some embodiments, a reference signal is directed to an RRC idle mode UE, an RRC inactive mode UE or an RRC connected mode UE.

(1) The operations for the RRC idle mode UE include:
  (a) Public Land Mobile Network (PLMN) selection;
  (b) Broadcast of system information;
  (c) Cell re-selection mobility;
  (d) Paging for mobile terminated data initiated by 5GC; and
  (e) DRX for CN paging configured by Non Access Stratum (NAS).

(2) The operations for the RRC inactive mode UE include:
  (a) PLMN selection;
  (b) Broadcast of system information;
  (c) Cell re-selection mobility;
  (d) Paging is initiated by NG-RAN (RAN paging);
  (e) RAN-based notification area (RNA) is managed by NG-RAN;
  (f) DRX for RAN paging configured by NG-RAN;
  (g) 5GC-NG-RAN connection (both C/U-planes) is established for UE;
  (h) The UE AS context is stored in NG-RAN and the UE; and
  (i) NG-RAN knows the RNA which the UE belongs to.

(3) The operations for the RRC connected mode UE include:
  (a) 5GC-NG-RAN connection (both C/U-planes) is established for UE;
  (b) The UE AS context is stored in NG-RAN and the UE;
  (c) NG-RAN knows the cell which the UE belongs to;
  (d) Transfer of unicast data to/from the UE; and
  (e) Network controlled mobility including measurements.

FIG. 1 shows an example of a wireless communication system (e.g., an LTE, 5G or other cellular network) that includes a BS 120 and one or more user equipment (UE) 111, 112 and 113. In some embodiments, the downlink transmissions (141, 142, 143) include information associated with a first reference signal. In an example, the information may include a configuration of the first reference signal, an update for the first reference signal, or a valid period for the first reference signal. The UE may be, for example, a smartphone, a tablet, a mobile computer, a machine to machine (M2M) device, a terminal, a mobile device, an Internet of Things (IoT) device, and so on.

The present document uses section headings and subheadings for facilitating easy understanding and not for limiting the scope of the disclosed techniques and embodiments to certain sections. Accordingly, embodiments disclosed in different sections can be used with each other. Furthermore, the present document uses examples from the 3GPP New Radio (NR) network architecture and 5G protocol only to facilitate understanding and the disclosed techniques and embodiments may be practiced in other wireless systems that use different communication protocols than the 3GPP protocols.

In some embodiments, the information associated the first reference signal can be transmitted via a first signaling.

In some embodiments, the first signaling includes at least one of the following:

(1) A System Information Block (SIB). In some embodiments, the SIB includes at least one of SIB1, SIB2, SIB3 or SIB4.

(2) A downlink control information (DCI). In some embodiments, the DCI is transmitted via a physical downlink control channel (PDCCH) scrambled by at least one of the P-RNTI, the SI-RNTI, the RA-RNTI, or the TC-RNTI.

(3) A DCI with CRC scrambled by the P-RNTI. In some embodiments, the first signaling includes at least one of a short message indicator information field, a frequency-domain resource assignment information field, a time-domain resource assignment information field, a modulation and coding scheme (MCS) information field, a VRB-to-PRB mapping information field, a transport block (TB) scaling factor information field, or an information field located after a transport block (TB) scaling factor carried by the DCI with CRC scrambled by P-RNTI.

In some embodiments, the short message indicator field includes a code point with a value of "00" or "01" or "10".

In some embodiments, the first signaling includes at least one of the frequency-domain resource assignment information field, the time-domain resource assignment information field, the MCS information field, a VRB-to-PRB mapping information field, or a transport block (TB) scaling factor information field when only a short message is carried by the DCI or when no scheduling information for paging is carried by the DCI or when the code point of a short message indicator is "00" or "10".

(4) Short message. In some embodiments, the first signaling includes the short message when only the scheduling information for paging is carried or when short message is not present by the DCI or when the code point of short message indicator is "00" or "01". In some embodiments, the short message includes at least one of a 3rd bit to an 8th bit of the short message.

(5) A third reference signal. In some embodiment, the third reference signal is located before/after a Synchronization signal/PBCH block (SSB). In some embodiments, the third reference signal is located before a paging occasion (PO). In some embodiments, the third reference signal also includes the indication that whether UE needs to monitor a subsequent or additional POs.

In some embodiments, the information fields carried by the DCI with CRC scrambled by P-RNTI include:
  Short message indicator,
  Short message,
  Frequency-domain resource assignment,
  Time-domain resource assignment,
  MCS information field,
  Virtual resource block (VRB)-to-physical resource block (PRB) mapping,
  Transport block (TB) scaling factor, and
  Reserved bits.

In some embodiments, the short message indicator includes 2 bits. The code point of "01" denotes only scheduling information for Paging is present in the DCI. The code point of "10" denotes only short message is present in the DCI. The code point of "11" denotes both scheduling information for Paging and short message are present in the DCI. The code point of "00" is reserved.

In some embodiments, the short message includes 8 bits. The first bit which is the most significant bit indicates the system information modification. If the first bit is set to "1", it indicates a modification of system information other than SIB6, SIB7 or SIB8. The second bit which is the next most significant bit indicates the earthquake and tsunami warning system (ETWS)/commercial mobile alert system (CMAS) notification. The third bit to the eighth bit of the short message are reserved.

In some embodiments, the frequency-domain resource assignment information field, the time-domain resource assignment information field and the MCS information field, a VRB-to-PRB mapping information field, and a transport block (TB) scaling factor information field are reserved when only the short message is carried.

In some embodiments, there are reserved bits after the information field of TB scaling of DCI with CRC scrambled by P-RNTI.

In some embodiments, the short message is reserved when scheduling information for paging is carried.

In some embodiments, the reserved information fields can be configured to carry additional information, e.g., the configuration, the update indication, the availability of the first reference signal or paging occasion (PO) configuration, or other information of the first reference signal.

Embodiments to Provide the Configuration

In some embodiments, the configuration for a first reference signal can be transmitted via a first signaling. In an example, the first signaling includes at least one of the following:

(1) A System Information Block (SIB). In some embodiments, the SIB includes at least one of SIB1, SIB2, SIB3 or SIB4.

(2) A downlink control information (DCI). In some embodiments, the DCI is transmitted via a physical downlink control channel (PDCCH) with a Cyclic Redundancy Check (CRC) scrambled by at least one of the Paging Radio Network Temporary Identifier (P-RNTI), the System Information-RNTI (SI-RNTI), the Random Access RNTI (RA-RNTI), or the Temporary Cell RNTI (TC-RNTI).

(3) A DCI with CRC scrambled by the P-RNTI. In some embodiments, at least one of a frequency-domain resource assignment information field, a time-domain resource assignment information field, a modulation and coding scheme (MCS) information field, a Virtual Resource Block (VRB)-to-Physical Resource Block (PRB) mapping information field, a transport block (TB) scaling factor information field or an information field located after a transport block (TB) scaling factor carried by the DCI with CRC scrambled by P-RNTI indicates the configuration for the first reference signal.

In some embodiments, the at least one of the frequency-domain resource assignment information field, the time-domain resource assignment information field, the MCS information field, a VRB-to-PRB mapping information field, or a transport block (TB) scaling factor information field is used when only a short message is carried by the DCI or when no scheduling information for paging is carried by the DCI or the code point of a short message indicator is "00" or "10".

(4) Short message. In some embodiments, the short message are used to carry the configuration of a first reference signal if only the scheduling information for paging is carried or when short message is not present by the DCI or the code point of a short message indicator is "00" or "01". In some embodiments, the short message includes at least one of a 3rd bit to an 8th bit of the short message.

(5) A third reference signal. In some embodiment, the third reference signal is located before/after a Synchronization signal/PBCH block (SSB). In some embodiments, the third reference signal is located before a paging occasion (PO). In some embodiments, the third reference signal also includes the indication of whether the UE needs to monitor a subsequent or additional POs.

In some embodiments, the availability of the first reference signal includes a update indication of the first reference signal. In some embodiments, the update indication includes at least one of the activation indication, the deactivation indication or the modification indication.

In some embodiments, the activation indication of the first reference signal indicates the configuration of the first reference signal is valid; the de-activation indication of the first reference signal indicates the configuration of the first reference signal is invalid; and the modification indication of the first reference signal indicates the configuration of the first reference signal is to be modified.

Embodiments to Provide an Update Indication

In some embodiments, an activation indication or an update indication of the first reference signal can be transmitted via a first signaling. In an example, the first signaling includes at least one of the following:

(1) A System Information Block (SIB). In some embodiments, the SIB includes at least one of SIB1, SIB2, SIB3 or SIB4.

(2) A downlink control information (DCI). In some embodiments, the DCI is transmitted via a physical downlink control channel (PDCCH) scrambled by at least one of the P-RNTI, the SI-RNTI, the RA-RNTI, or the TC-RNTI.

(3) A DCI with CRC scrambled by the P-RNTI. In some embodiments, at least one of a short message indicator information field, a frequency-domain resource assignment information field, a time-domain resource assignment information field, a modulation and coding scheme (MCS) information field, a VRB-to-PRB mapping information field, a transport block (TB) scaling factor information field, or an information field located after a transport block (TB) scaling factor carried by the DCI with CRC scrambled by P-RNTI indicates an update indication for the first reference signal.

In some embodiments, the short message indicator field includes a code point with a value of "00" or "01".

In some embodiments, the at least one of the frequency-domain resource assignment information field, the time-domain resource assignment information field, the MCS information field, a VRB-to-PRB mapping information field, or a transport block (TB) scaling factor information field is used when only a short message is carried by the DCI or when no scheduling information for paging is carried by the DCI or the code point of a short message indicator is "00" or "10".

(4) Short message. In some embodiments, the short message is used to carry the update indication of the first reference signal when only the scheduling information for paging is carried or when short message is not present by the DCI or the code point of short message indicator is "00" or "01". In some embodiments, the short message includes at least one of a 3rd bit to an 8th bit of the short message.

(5) A third reference signal. In some embodiment, the third reference signal is located before/after a Synchronization signal/PBCH block (SSB). In some embodiments, the third reference signal is located before a paging occasion (PO). In some embodiments, the third reference signal also includes the indication that whether UE needs to monitor a subsequent or additional POs.

Embodiments to Provide Update Indications and PO Configuration

In some embodiments, an update indication of the first reference signal can be jointly indicated with a paging occasion (PO) configuration.

In some embodiments, the PO configuration includes at least one of a grouping information of paging occasions, a time-domain allocation of the PO or a frequency-domain allocation of the PO.

Embodiments to Indicate the Availability of the First Reference Signal

In some embodiments, the first reference signals are also transmitted to an RRC connected mode UE. When the UE is configured with discontinuous reception (DRX), the first reference signals are not required to be transmitted during the DRX-off state. In some embodiments, the configuration of the first reference signal is the same as one of the reference signals configured by network by UE-specific radio resource control (RRC) signaling.

Embodiments of the disclosed technology can be configured to enable the network to inform the RRC idle mode or RRC inactive mode UE when the first reference signals are valid or when the first reference signals are not transmitted (e.g., when the RRC connected mode UE is in a DRX-off state). Otherwise, it would be power consuming if UE continues to detect the first reference signal.

In some embodiments, the availability indication of the first reference signal can be transmitted via a first signaling. In an example, the first signaling includes at least one of the following:

(1) A System Information Block (SIB). In some embodiments, the SIB includes at least one of SIB1, SIB2, SIB3 or SIB4.

(2) A downlink control information (DCI). In some embodiments, the DCI with CRC is scrambled by at least one of the P-RNTI, SI-RNTI, RA-RNTI, TC-RNTI.

(3) A DCI with CRC scrambled by the P-RNTI. In some embodiments, at least one of a short message indicator information field, a frequency-domain resource assignment information field, a time-domain resource assignment information field, a modulation and coding scheme (MCS) information field, a VRB-to-PRB mapping information field, a transport block (TB) scaling factor information field, or an information field located after a transport block (TB) scaling factor carried by the DCI with CRC scrambled by P-RNTI indicates an update indication for the first reference signal.

In some embodiments, the short message indicator field includes a code point with a value of "00" or "01".

In some embodiments, the at least one of the frequency-domain resource assignment information field, the time-domain resource assignment information field, the MCS information field, a VRB-to-PRB mapping information field, or a transport block (TB) scaling factor information field is used when only a short message is carried by the DCI or when no scheduling information for paging is carried by the DCI or the code point of a short message indicator is "00" or "10".

(4) Short message. In some embodiments, the short message is used to carry the update indication of the first reference signal when only the scheduling information for paging is carried or when short message is not present by the DCI or the code point of short message indicator is "00" or "01". In some embodiments, the short message includes at least one of a 3rd bit to an 8th bit of the short message.

(5) A third reference signal. In some embodiments, the third reference signal is located before/after a Synchronization signal/PBCH block (SSB). In some embodiments, the third reference signal is located before a paging occasion (PO). In some embodiments, the third reference signal also includes the indication that whether UE needs to monitor a subsequent or additional POs.

In some embodiments, the availability indication of the first reference signal in the first signaling includes at least one of the following:

(1) Whether the first reference signal is always available or not. In an example, if the first signaling indicates the first reference signal is always available, it means the first reference signal is available. In an example, if the first signaling indicates the first reference signals is not always available, it means the first reference signal is available during a valid period or UE can detect the first reference signal during a valid period.

Figure 2A:
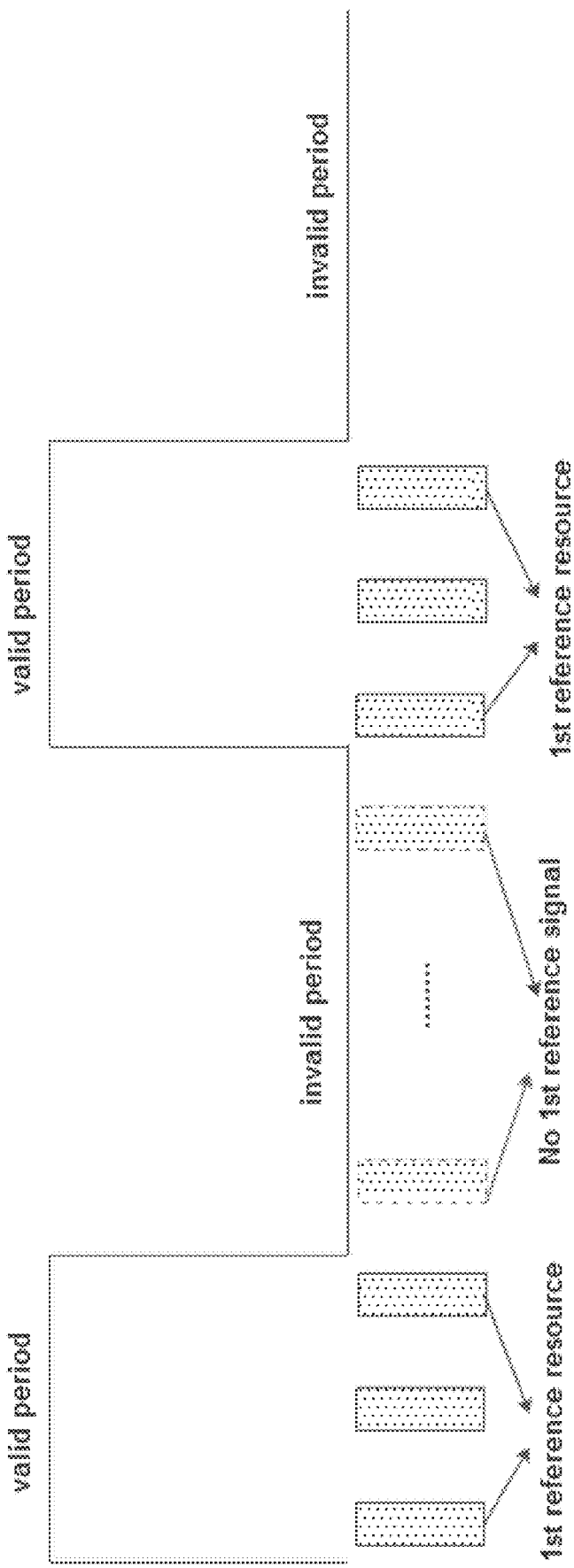
FIGS. 2A and 2B show examples of a valid transmission period for a first reference signal.

(2) A valid period. In some embodiments, the first reference signal is available during the valid period or UE can detect the first reference signal during the valid period or network transmits the first reference signal during the valid period. An example is shown in FIG. 2A. In an example, the valid period includes one or more occasions for the first reference signal, which are indicated by shaded regions in a "valid period" in FIG. 2A.

Figure 2B:
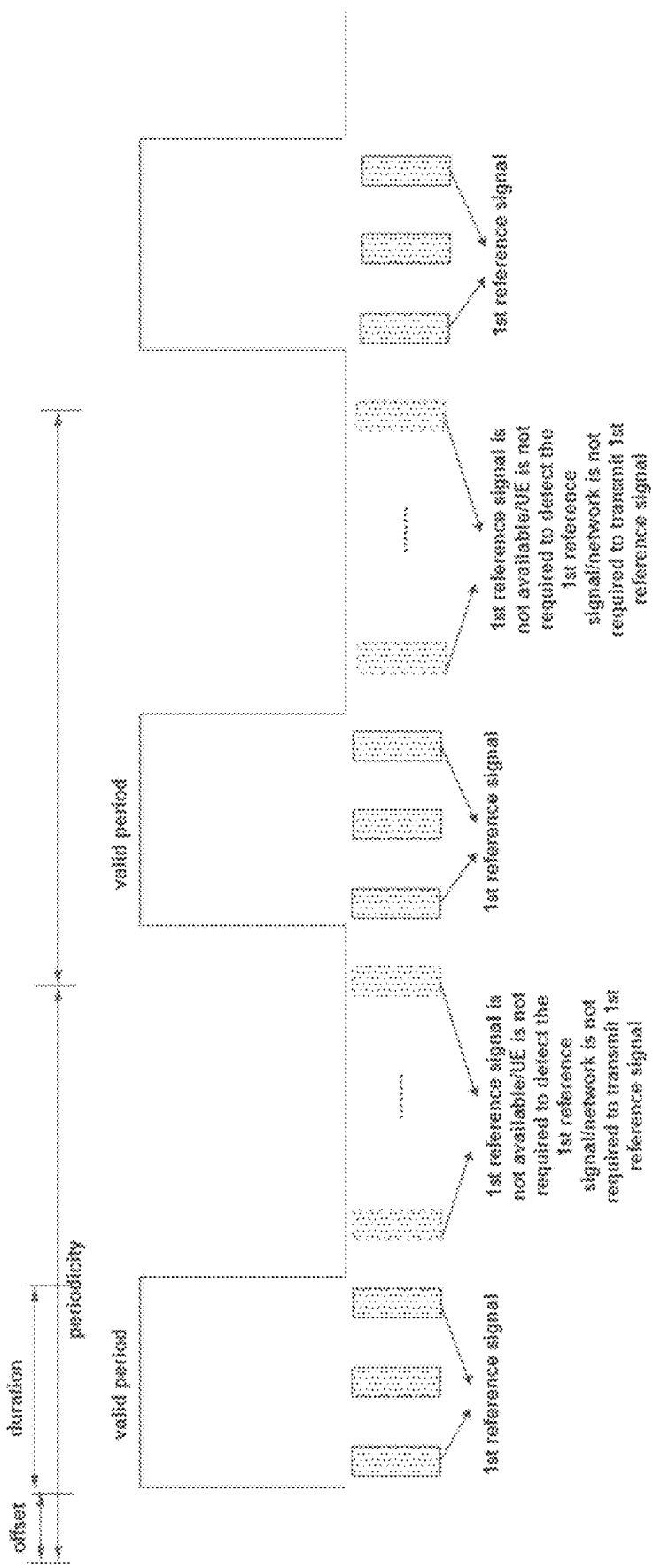

In some embodiments, a valid period is based on at least one of a periodicity, an offset or a duration. An example is shown in FIG. 2B. In some embodiments, a valid period is based on a periodicity and a duration.

Embodiments of Types of First Reference Signals

In some embodiments, the first reference signal includes at least one or more Channel State Information Reference Signals (CSI-RS), secondary synchronization signals (SSS), or primary synchronization signals (PSS). In an example, the CSI-RS includes a CSI-RS for mobility, a CSI-RS for tracking, and/or a CSI-RS for a Layer 1 (L1) reference signal received power (RSRP) computation.

In some embodiments, the CSI-RS for L1-RSRP includes a Non-Zero-Power (NZP)-CSI-RS-ResourceSet with the "repetition" parameter set to "on."

In some embodiments, the CSI-RS for L1-RSRP includes a CSI-RS resource set that has the same spatial filter parameter for all the CSI-RS resources within.

In some embodiments, the CSI-RS for L1-RSRP includes a NZP-CSI-RS-ResourceSet with the "repetition" parameter set to "off."

In some embodiments, the CSI-RS for tracking includes a NZP-CSI-RS-ResourceSet configured with higher layer parameter trs-Info.

In some embodiments, the CSI-RS for mobility includes a CSI-RS resource used for RRM measurement.

Embodiments for the Configuration of a First Reference Signal

The configuration of a first reference signal includes at least one of the time-domain configuration, frequency-domain configuration, power-domain configuration, or antenna domain configuration.

In some embodiments, the time domain configuration includes at least one of the following: a periodicity, an offset, a duration, a reference point in time domain, a number of the first reference signal within the periodicity, a number of symbols occupied by the first reference signal within a slot, a plurality of symbols occupied by the first reference signal within a slot, a start of symbol occupied by the first reference signal within a slot, a density or a gap between the adjacent first reference signal.

In some embodiments, a slot with the first reference signal is determined by at least one of a periodicity, an offset, a duration or a reference point in time domain.

In some embodiments, a slot with the first reference signal is determined by at least one of an offset, a duration or a reference point in time domain. In an example, the first reference signal is determined by the offset with respect to the reference point in time domain. In this example, the periodicity of the first reference signal is predefined. For an example, the periodicity of the first reference signal is determined by at least one of the following:

The periodicity of the SSB burst,
The periodicity of DRX cycle,
Paging frame,
Number of paging frame within a DRX cycle,
Number of PO within a paging frame.

In this example, the network does need to broadcast the periodicity of the first reference signal by the first signaling, the resource overhead can be reduced.

In some embodiments, the offset determines the slot with the first reference signal includes one or more offset values. In an example, the offset includes an offset-1 and an offset-2. The subframe with the first reference signal is based on the offset-1. And the slot within the subframe with the first reference signal is based on the offset-2.

In some embodiments, a pattern of the first reference signal within slot is determined by at least one of the following: a number of symbols occupied by the first reference signal within a slot, a plurality of symbols occupied by the first reference signal within a slot, or a start of symbol occupied by the first reference signal within a slot.

Embodiments of Time-Domain Configurations of a First Reference Signal

In some embodiments, the configuration of a first reference signal includes a time-domain configuration. In some embodiments, a plurality of parameters of a time-domain configuration for the CSI-RS for tracking, the CSI-RS for mobility or the CSI-RS for L1-RSRP are the same. In some embodiments, a plurality of parameters of a time-domain configuration are applied for the CSI-RS for tracking, the CSI-RS for mobility or the CSI-RS for L1-RSRP.

In some embodiments, the time-domain configuration includes a periodicity and/or an offset. In an example, the periodicity of the first reference signal fulfills a predefined requirement, which can include at least one of the following:
(1) The periodicity is greater than a first threshold.
(2) The periodicity is less than a second threshold.

In an example, the offset of the first reference signal fulfills a predefined requirement, which can include at least one of the following:
(1) The offset is greater than a third threshold.
(2) The offset is less than a fourth threshold.

The offset ranges from negative values to positive values.

In some embodiments, the first/second/third/fourth threshold is based on at least one of the following:
The periodicity of the SSB burst,
The periodicity of DRX cycle,
Paging frame,
Number of paging frames within a DRX cycle,
Number of POs within a paging frame.
Number of PDCCH monitoring occasions within a PO.

In some embodiment, the periodicity of the SSB burst is the periodicity of the half frame with SSB.

In some embodiments, the SSB comprises a Primary Synchronization Signal (PSS), a Secondary Synchronization Signal (SSS), a Physical Broadcast Channel (PBCH) with associated Demodulation Reference Signal (DM-RS) in consecutive symbols. The SSB burst comprises one or more SSBs. In an example, the one or more SSBs within one SSB burst are in the same half frame. The number of SSB or indexes of the transmitted SSB within the SSB burst can be indicated by network.

In an example, the first/second threshold is the periodicity of the SSB burst.

In an example, the periodicity of the SSB burst is 20 ms for initial access, and thus the first/second threshold can be set to 20 ms.

In an example, the first reference signal is configured to be provided as a supplement to the SSB. In this case, the power savings would be reduced if the first reference signal had a periodicity that was no greater than that of the SSB, or if it were located close to the SSB.

In some embodiments, the offset of the first reference signal can be defined with respect to a reference point in time domain associated with the SSB burst.

The reference point in time domain associated with the SSB burst includes at least one of the following:

(a) A start or an end of the SSB burst or a SSB within the SSB burst. In this example, the reference point in time domain can be the start or end of the SSB burst or a SSB within the SSB burst. In some examples, a SSB within the SSB burst is configured to be the reference point in the time domain.

(b) A slot with a start or an end of the SSB burst or a SSB within the SSB burst.

(c) A subframe with a start or an end of the SSB burst or a SSB within the SSB burst. In some examples, a SSB within the SSB burst is configured to be the reference point in the time domain.

(d) A start or an end of the half frame with the SSB burst or a SSB within the SSB burst. In some examples, a SSB within the SSB burst is configured to be the reference point in the time domain.

(e) A start or an end of the PSS, the SSS, the Physical Broadcast Channel (PBCH), or the Demodulation Reference Signal (DM-RS) associated with the PBCH.

(f) A slot with a start or an end of the PSS, the SSS, the Physical Broadcast Channel (PBCH), or the Demodulation Reference Signal (DM-RS) associated with the PBCH.

(g) A subframe with slot with a start or an end of the PSS, the SSS, the Physical Broadcast Channel (PBCH), or the Demodulation Reference Signal (DM-RS) associated with the PBCH.

Figure 3:
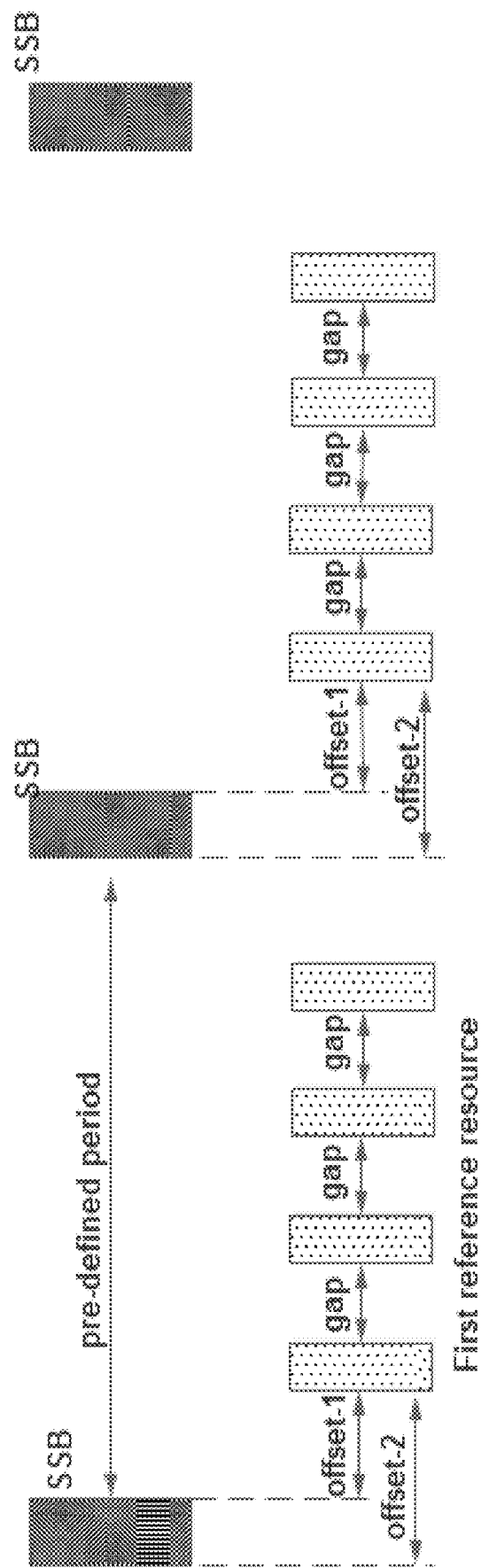
FIG. 3 shows an example of multiple first reference resources within a predefined period between Synchronization Signal/Physical Broadcast Channel (PBCH) Blocks (SSBs).

An example embodiment is shown in FIG. 3.

As shown in FIG. 3, there are one or more first reference signals within a predefined period. The time domain configuration of the one or more first signals have at least one of the following characteristics:

(a) The predefined period includes a multiple of the periodicity of the SSB burst. In an example, the predefined period is the periodicity of the SSB burst.

(b) The gaps between the adjacent first reference signals within a single predefined period are the same.

In this example, the time domain configuration includes the gap between the adjacent first reference signals or a density.

Figure 4:
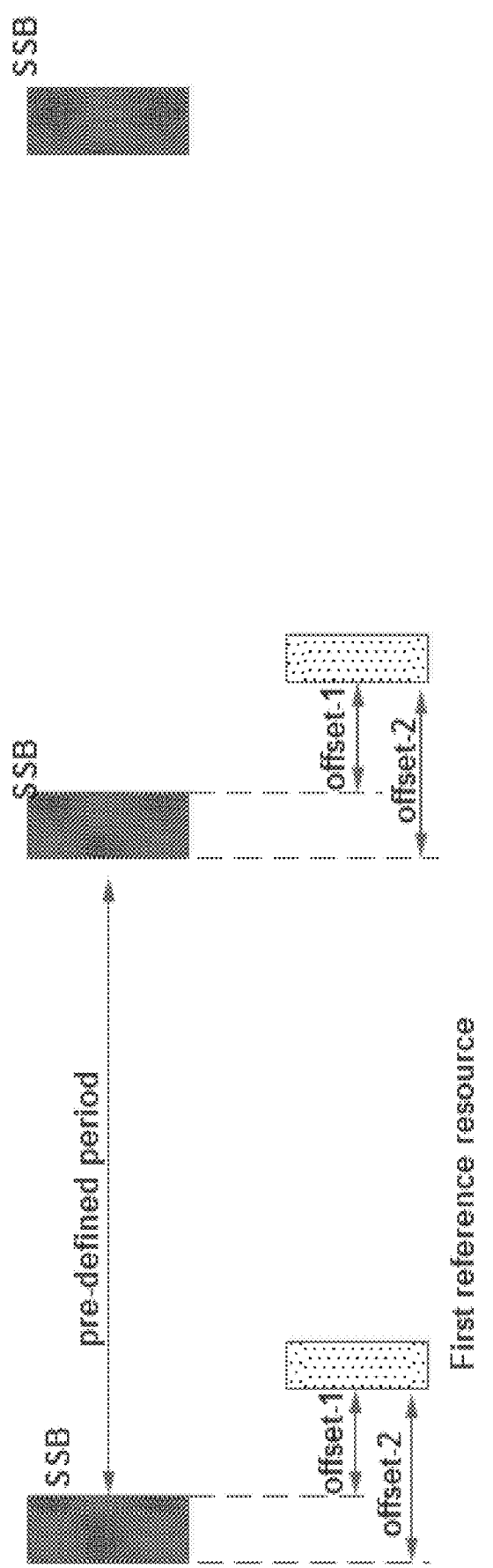
FIG. 4 shows an example of one first reference resource within a predefined period between SSBs.

An example embodiment is shown in FIG. 4.

As shown in FIG. 4, there is a first reference signal within the predefined period. In an example, the predefined period includes a multiple of the periodicity the SSB burst. In another example, the predefined period is the periodicity of the SSB burst.

In some embodiments, the offset of the first reference signal is defined with respect to a paging occasion (PO) or a paging frame. In an example, the reference point in the time domain associated with the PO or the paging frame includes at least one of the following:

(a) A start or an end of a paging frame.

(b) A start or an end of a first PDCCH monitoring occasion within the paging frame.
(c) A slot with a start or an end of a first PDCCH monitoring occasion within the paging frame.
(d) A subframe with a start or an end of a first PDCCH monitoring occasion within the paging frame.
(e) A start or an end of a last PDCCH monitoring occasion within the paging frame.
(f) A slot with a start or an end of a last PDCCH monitoring occasion within the paging frame.
(g) A subframe with a start or an end of a last PDCCH monitoring occasion within the paging frame.
(h) A start or an end of a PO.
(i) A start or an end of a first PDCCH monitoring occasion within the PO.
(j) A slot with a start or an end of a first PDCCH monitoring occasion within the PO.
(k) A subframe with a start or an end of a first PDCCH monitoring occasion within the PO.
(l) A start or an end of a last PDCCH monitoring occasion within the PO.
(m) A slot with a start or an end of a last PDCCH monitoring occasion within the PO.
(n) A subframe with a start or an end of a last PDCCH monitoring occasion within the PO.

Figure 5:
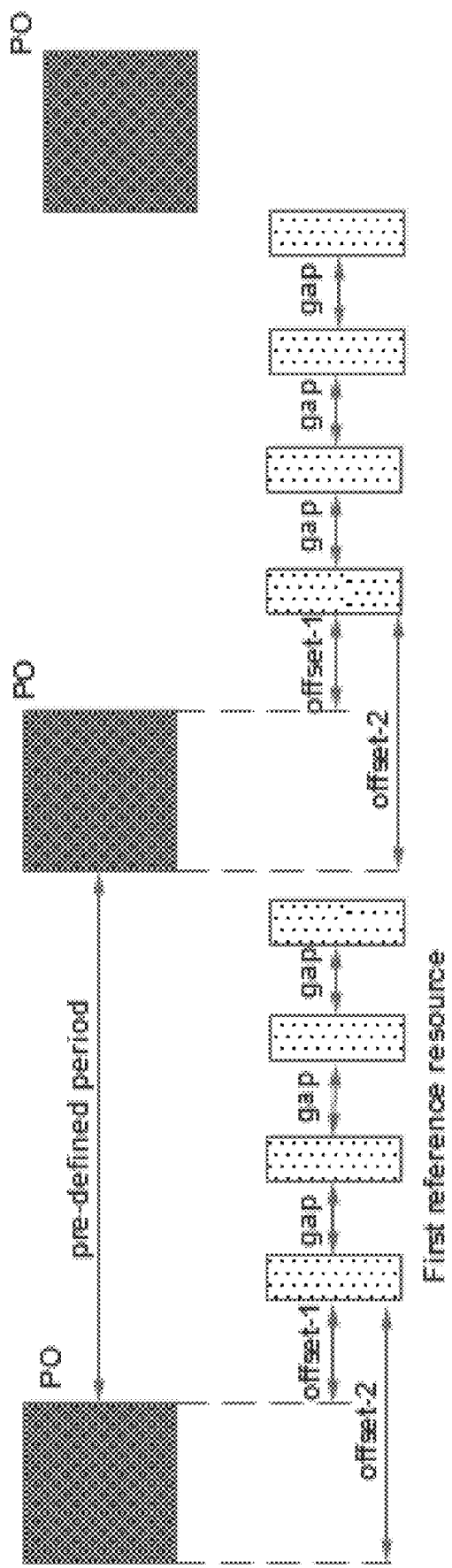
FIG. 5 shows an example of multiple first reference resources within a predefined period between Paging Occasions (POs).

An example embodiment is shown in FIG. 5. As shown therein, there are one or more first reference signals within a predefined period. The time domain configuration of the one or more first signals have at least one of the following characteristics:
(a) The predefined period is a multiple of the DRX cycle or the paging frame. In an example, the predefined period is the DRX cycle or the paging frame.
(b) The gaps between the adjacent first reference signals within a single predefined period are the same.

In this example, the time domain configuration includes the gap between the adjacent first reference signals or a density.

Figure 6:
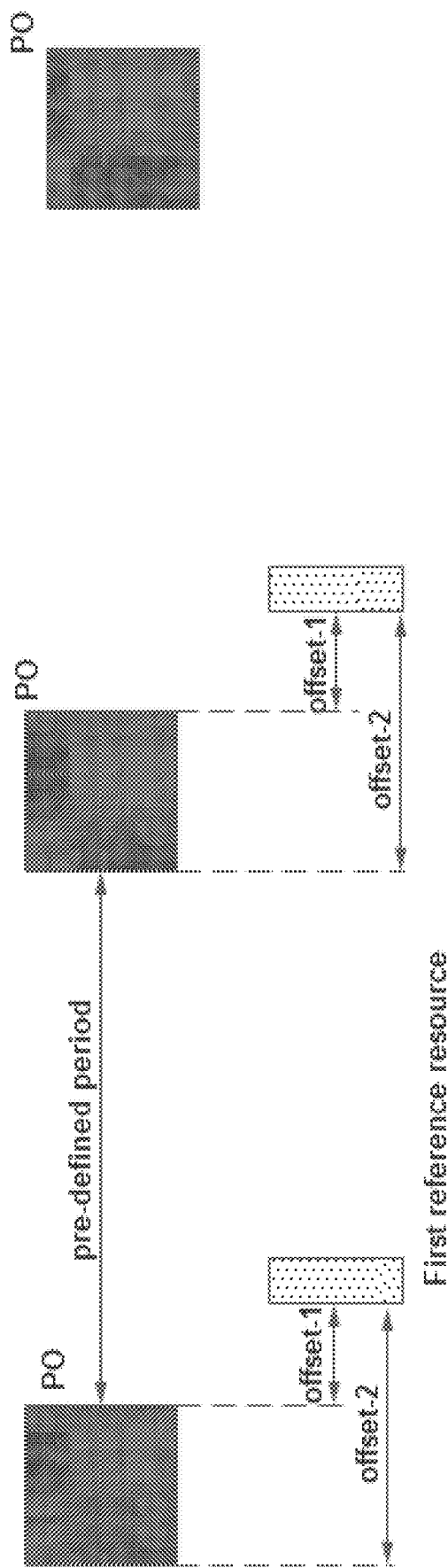
FIG. 6 shows an example of one first reference resource within a predefined period between POs.

An example embodiment is shown in FIG. 6. As shown therein, there is a first reference signal within a predefined period.

Figure 7:
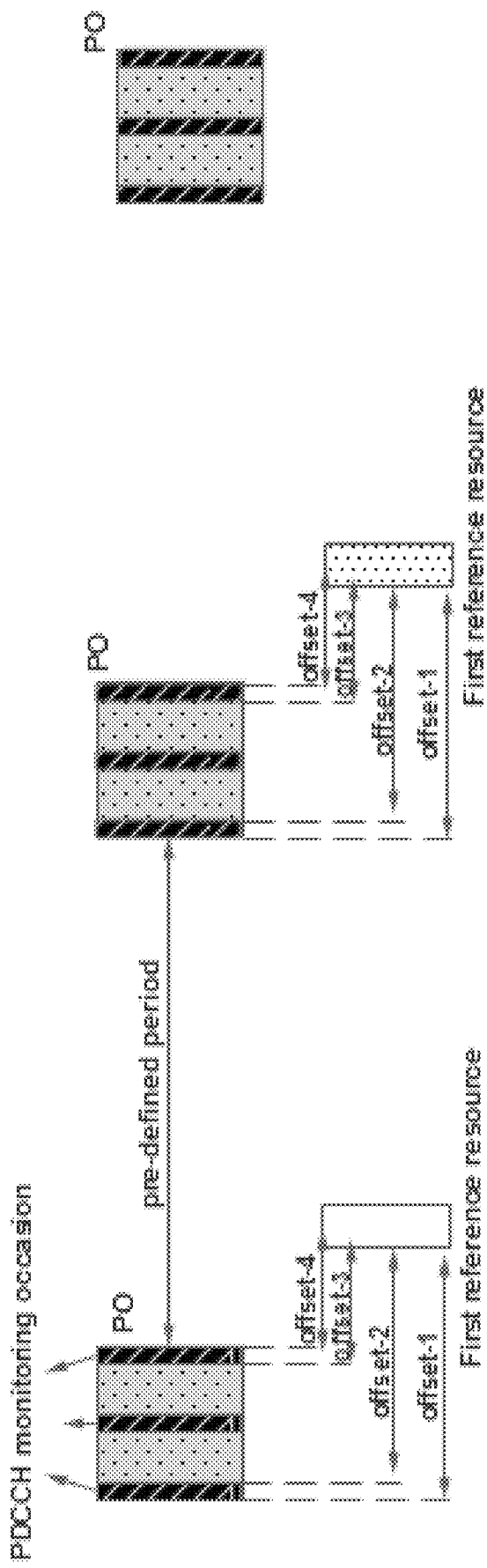
FIG. 7 shows an example of varying offsets between the Physical Downlink Control Channel (PDCCH) monitoring occasions of a Paging Occasion (PO) and the first reference signal.

An example embodiment is shown in FIG. 7. As shown therein, the offset can be defined as the time gap between a reference point in the time domain and the first reference signal. Wherein the reference point in the time domain can be a start or an end of a PO, or a start or an end of a first PDCCH monitoring occasion within the PO or a start or an end of a last PDCCH monitoring occasion within the PO.

One Paging Frame (PF) is one Radio Frame and may contain one or multiple PO(s) or starting point of a PO. A paging occasion (PO) is a set of PDCCH monitoring occasions and can consist of multiple time slots (e.g., subframe or OFDM symbol) in which the paging DCI can be sent. UE detects the PO for the scheduling information of paging message and/or system information update indication.

In some embodiments, the PF and PO for paging are determined by the following formula:
SFN for the PF is determined by:

$$(SFN+PF\_offset) \bmod T = (T \text{ div } N)*(UE\_ID \bmod N)$$

Index (i_s), indicating the index of the PO is determined by:

$$i\_s = \text{floor}(UE\_ID/N) \bmod Ns$$

A PO is a set of 'S' consecutive PDCCH monitoring occasions where 'S' is the number of actual transmitted SSBs determined according to ssb-PositionsInBurst in SIB1.

The following parameters are used for the calculation of PF and i_s above:
T: DRX cycle of the UE
N: number of total paging frames in T
Ns: number of paging occasions for a PF
PF_offset: offset used for PF determination
UE_ID: 5G-S-TMSI mod 1024

Embodiments of Frequency-Domain Configurations of a First Reference Signal

In some embodiments, the configuration of the first reference signal includes a frequency-domain configuration. In some embodiments, a plurality of parameters of frequency-domain configuration for the CSI-RS for tracking, the CSI-RS for mobility and the CSI-RS for L1-RSRP are the same.

In some embodiments, a plurality of parameters of a time-domain configuration are applied for the CSI-RS for tracking, the CSI-RS for mobility or the CSI-RS for L1-RSRP.

In some embodiments, the frequency domain configuration includes at least one of the following: a number of physical resource blocks (PRBs) and/or an offset, a number of resource element (RE) occupied by the first reference signal within a PRB, a plurality of REs occupied by the first reference signal within a PRB, a start of RE occupied by the first reference signal within a PRB, or a frequency density.

In some embodiments, a PRB with the first reference signal is determined by at least one of a number of physical resource blocks (PRBs) and/or an offset.

In some embodiments, an RE with the first reference signal is determined by at least one of a number of REs occupied by the first reference signal within a PRB, a plurality of REs occupied by the first reference signal within a PRB, a start of RE occupied by the first reference signal within a PRB, or a frequency density.

In some embodiments, the frequency-domain configuration includes an indication of a number of physical resource blocks (PRBs) and/or an offset.

In some embodiments, the offset of a first reference signal is defined with respect to a second reference signal or resource block.

In some embodiments, the second reference signal includes at least one of an SSB, a PSS, an SSS, a PBCH, or a DM-RS associated with the PBCH.

In some embodiments, the resource block includes the Control Resource Set (CORESET) associated with the paging search space or CORESET 0.

In some embodiments, the offset of the first reference signal is defined with respect to the lowest PRB index or highest PRB index or start or end or the center of the second reference signal or resource block.

In some embodiments, the offset of the first reference signal is defined with respect to Point A or absolute frequency position of the reference resource block or Common resource block 0.

Embodiments for the QCL Assumption of a First Reference Signal

In some embodiments, the spatial domain configuration includes a quasi-colocation (QCL) relationship or spatial filter parameter. In some embodiments, the type of the first reference signal includes 'QCL-TypeD' with an SS/PBCH block.

Embodiments for Power of a First Reference Signal

In some embodiments, the power-domain configuration includes a power parameter. In some embodiments, the power parameter is the ratio of the first reference signal Energy Per Resource Element (EPRE) to the PSS EPRE, or the SSS EPRE, or the PBCH EPRE, or the DM-RS associated with PBCH EPRE. In some embodiments, the ratio of the first reference signal EPRE to PSS EPRE, or SSS EPRE, or PBCH EPRE, or DM-RS associated with PBCH EPRE is fixed or predefined.

Embodiments of CSI-RS for Mobility

In some embodiments, the first reference signal includes the CSI-RS for mobility and the CSI-RS for L1-RSRP.

The CSI-RS for L1-RSRP includes a CSI-RS resource set with the repetition parameter set to "on." The CSI-RS for mobility is used for RRM measurements.

Embodiments of the disclosed technology are configured to broadcast the CSI-RS for mobility to RRC idle mode UEs and RRC inactive mode UEs. In other embodiments, the CSI-RS for L1-RSRP includes CSI-RS resources that have the same spatial filter.

At least one of RRM measurements, cell selection or cell re-selection is performed based on the first reference signal.

In some embodiments, the first reference signal is only used for the serving cell measurement.

In some embodiments, the cell selection or cell re-selection or cell ranking is based on the SSB and/or the first reference signal. In some embodiments, the criteria or parameters for cell selection based on the SSB and the first reference signal are configured separately. In an example, the same type of reference signal (SSB or the first reference signal) is used to compare the evaluation of different cells. In another example, the cell selection or cell re-selection or cell ranking criterion is fulfilled when the evaluation results based on the SSB or the evaluation results based on the first reference signal meets the criterion. In another example, the cell selection or cell re-selection criterion or cell ranking is fulfilled when both the evaluation results based on the SSB and the evaluation results based on the first reference signal meet the criterion.

In some embodiments, the cell selection criterion is the cell selection criterion S.

In some example, the cell selection criterion S is fulfilled when either the evaluation results based on SSB or the first reference signal fulfill the following requirement: $S_{rxlev}>0$ AND $S_{qual}>0$, wherein $S_{rxlev}$ is the cell selection RX level value (dB), and $S_{qual}$ is the cell selection quality value (dB).

In another example, the cell selection criterion S is fulfilled when both the evaluation results based on SSB and the first reference signal fulfill the following requirement: $S_{rxlev}>0$ AND $S_{qual}>0$, wherein $S_{rxlev}$ is the cell selection RX level value (dB), and $S_{qual}$ is the cell selection quality value (dB).

In some embodiments, the measurement is based on a combination of the SSS and the first reference signal. In an example, for SS-RSRP determination, the first reference signal in addition to secondary synchronization signals may be used. In another example, for SS-SINR determination, the first reference signal in addition to secondary synchronization signals may be used.

In some embodiments, the SSS and the first reference signal are QCL-ed with QCL type D. In some embodiments, the SSB and the first reference signal are QCL-ed with QCL type D. In some embodiments, the power ratio of the first reference signal to the SSS is configured or predetermined. For example, the ratio of the first reference signal EPRE to PSS EPRE, or SSS EPRE, or PBCH EPRE, or DM-RS associated with PBCH EPRE is fixed or predefined.

In some embodiments, the first signaling includes a configuration of the first reference signal, a threshold value, or a parameter for serving cell selection or intra/inter cell re-selection or inter-RAT re-selection, wherein the serving cell selection or intra/inter cell re-selection or inter-RAT re-selection is based on the first reference signal.

In some example, the first signaling includes an indication of whether the timing of the serving cell can be used to derive the timing of a neighbor cell.

In some example, the configuration or the threshold value or the parameter for serving cell selection is carried by SIB1.

In some example, the configuration or the threshold value or the parameter for intra cell re-selection by SIB2 or SIB3.

In some example, the configuration or the threshold value or the parameter for inter cell re-selection by SIB2 or SIB4.

In some example, the configuration or the threshold value or the parameter for inter RAT re-selection by SIB2 or SIB5.

Embodiments of CSI-RS for Tracking

In some embodiments, the first reference signal includes a CSI-RS for tracking.

In some embodiments, the resource type of the first reference signal is periodic and/or semi-persistent.

In some embodiments, the number of antenna ports of the first reference signal is one.

Embodiments of First Reference Signal and PO

In some implementations, a PDCCH monitoring occasion with the PO corresponds to an SSB, or the PDCCH monitoring occasion with the PO has the same transmission beam with the SSB. In some implementations, the UE needs to wake up in advance to detect beam information, and then select the beam(s) for the reception of PO. In the event that the gap between the PO and the SSB are large, the UE cannot enter into a deep sleep for a long duration, which is power consuming. The following disclosed embodiments provide solutions to allow a UE to obtain the beam information via the first reference signal. The first reference signal is located close to the PO, which would reduce the wake-up period of UE to save power consumption.

In some embodiments, the first reference signal includes a CSI-RS. In an example, the CSI-RS includes CSI-RS for L1-RSRP.

In some embodiments, the transmission beam of the first reference signal is the same as one or more PDCCH monitoring occasions within a PO.

In some embodiments, a first reference signal corresponds to one or more PDCCH monitoring occasions within a PO. In some embodiments, a first reference signal of a plurality of first reference signals corresponds to a PDCCH monitoring occasion within a PO. In some embodiments, each first reference signal of the plurality of first reference signals corresponds to a PDCCH monitoring occasion within a PO. In some embodiments, the k-th reference signal of a plurality of first reference signals corresponds to the k-th PDCCH monitoring occasion within a PO, wherein k is a positive integer. In some embodiments, the plurality of first reference signals is configured within the same reference resource set. In an example, the plurality of first reference signals is configured within the same reference resource set with repetition set to "off". In an example, the spatial filter parameters of the plurality of first reference signals configured within the same reference resource set are not assumed to be the same.

In some embodiments, one or more first reference signals correspond to one PDCCH monitoring occasion. In an example, the spatial filter parameter or transmission beam of the one or more first reference signals are the same. In another example, the one or more first reference signals are QCL-ed with QCL type D. In some embodiments, the one or more first reference signals are configured within the same reference resource set. In some embodiments, the i-th reference resource set corresponds to the i-th PDCCH monitoring occasions within a PO, wherein i is a positive integer.

In some examples, the one or more first reference signals are configured within the same reference resource set with repetition set to "on".

In some embodiments, the correspondence relationship between the first reference signal and the PDCCH monitoring occasion is predefined. In some embodiments, the correspondence relationship between the first reference signal and the PDCCH monitoring occasion is indicated or updated by the first signaling.

In some embodiments, the number of antenna ports of the first reference signal is one.

Figure 8:
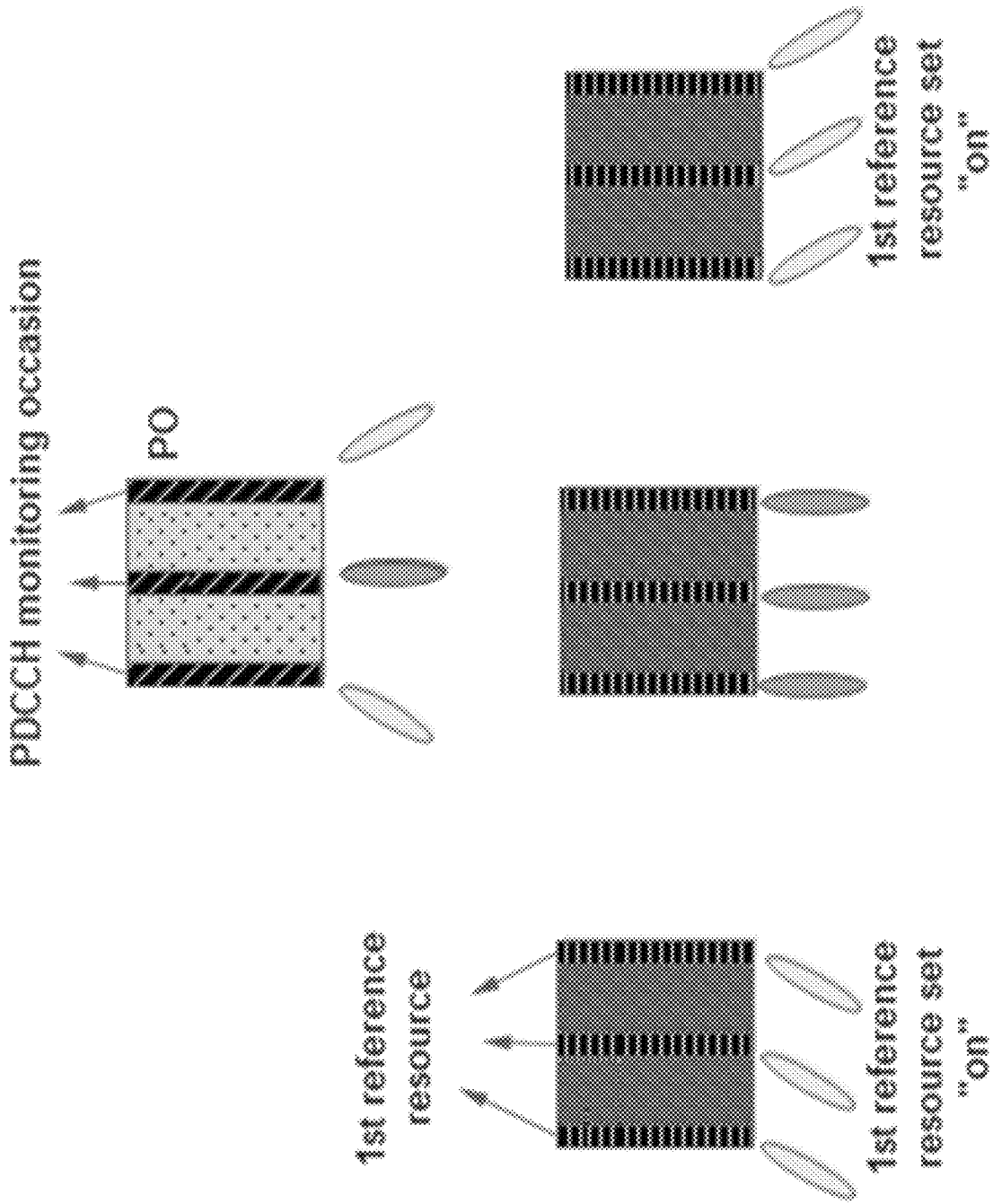
FIG. 8 shows an example of first reference resource sets with the same spatial filter parameter and PDCCH monitoring occasions of a Paging Occasion (PO).

An example is shown in FIG. 8. As shown therein, the first reference signal includes a CSI-RS resource set. In an example, the CSI-RS resources within the CSI-RS resource set have the same spatial filter. A resource set is used to associate with or corresponds to a PDCCH monitoring occasion within the PO. The i-th resource set corresponds to the i-th PDCCH monitoring occasion within the PO, wherein i=1, 2, or 3.

Figure 9:
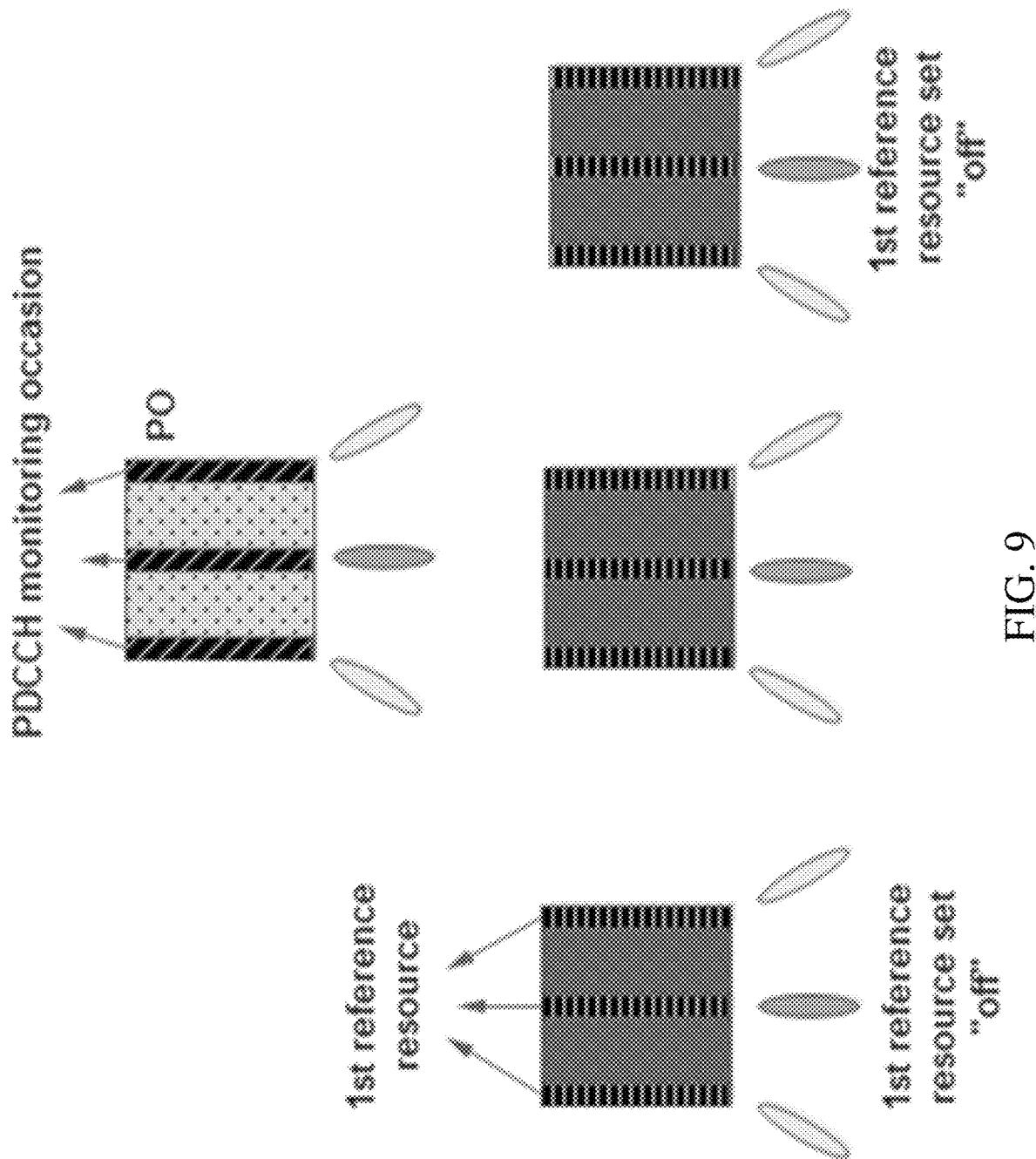
FIG. 9 shows an example of first reference resource sets with different spatial filter parameters and PDCCH monitoring occasions of a Paging Occasion (PO).

Another example is shown in FIG. 9. As shown therein, the first reference signal includes a CSI-RS resource set. In an example, there are one or more first reference signals within the set. A first reference signal used to associate with or corresponds to a PDCCH monitoring occasion within the PO. The k-th first reference signal of the resource set corresponds to the k-th PDCCH monitoring occasion within the PO, wherein k=1, 2, or 3.

Embodiments for the RRC Connected Mode UE

The first reference signal configured by the first signaling can also be detected by RRC connected mode UE.

In some embodiments, the first reference signal configured by UE-specific signaling has lower priority than the first signaling. For example, the first reference signal configured by RRC signaling has lower priority than the first signaling.

In some embodiments, the first reference signal configured by UE-specific signaling and the first signaling are the same.

In some embodiments, the configuration of the first reference signal by UE-specific signaling overrides the configuration by the first signaling.

In some embodiments, a plurality of parameters of the first reference signal configured by UE-specific signaling overrides the parameters configured by the first signaling.

In some embodiments, a plurality of parameters of the first reference signal configured by the first signaling overrides the parameters configured by UE-specific signaling.

In some embodiments, a plurality of parameters of the first reference signal configured by UE-specific signaling have higher priority than the parameters configured by the first signaling.

In some embodiments, a plurality of parameters of the first reference signal configured by the first signaling have higher priority than the parameters configured by UE-specific signaling.

In some embodiments, the first reference signal can be determined by a plurality of parameters configured by UE-specific signaling in addition to another plurality of parameter configured by the first signaling.

In some embodiments, a first reference signal configured by UE-specific signaling is not allowed to be FDM-ed or TDM-ed with another first reference signal configured by the first signaling.

In some embodiments, the first reference signal is determined by a plurality of parameters of the first reference signal that are configured by the first signaling and/or UE-specific RRC signaling. In an example, some of the parameters of the first reference signal carried by the first signaling can also be used to configure the first reference signal to reduce the resource overhead.

Additional Embodiments of the Disclosed Technology

Figures 10A, 10B:
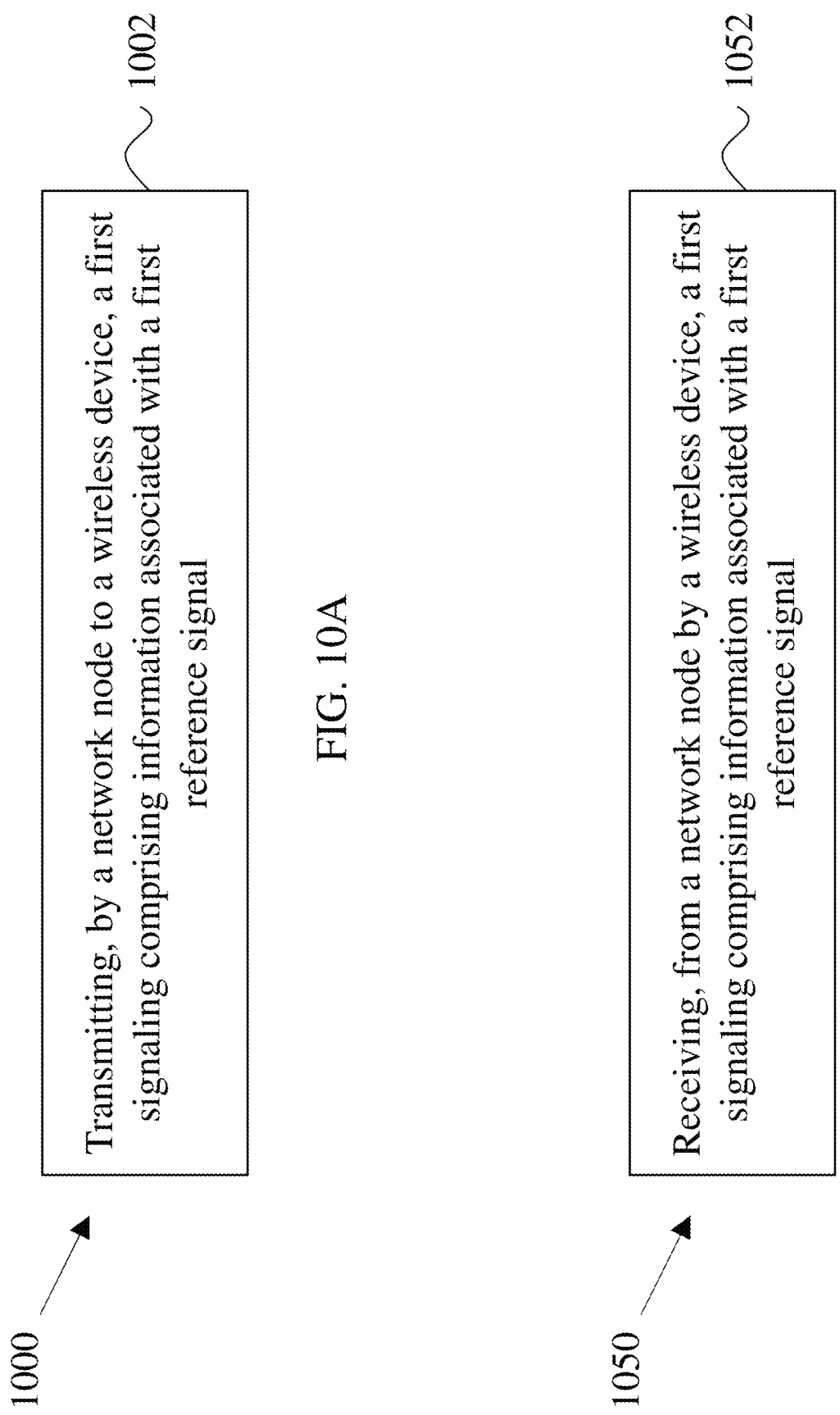
FIGS. 10A and 10B show examples of a wireless communication methods.

FIG. 10A shows an example of a wireless communication method 1000. The method 1000 includes, at operation 1002, transmitting, by a network node to a wireless device, a first signaling comprising information associated with a first reference signal. In some embodiments, the information comprises at least one of a configuration of the first reference signal, an update information of the first reference signal, or a valid period of the first reference signal.

FIG. 10B shows an example of a wireless communication method 1050. The method 1050 includes, at operation 1052, receiving, from a network node by a wireless device, a first signaling comprising information associated with a first reference signal. In some embodiments, the information comprises at least one of a configuration of the first reference signal, an update information of the first reference signal, or a valid period of the first reference signal.

In some embodiments, the following technical solutions can be implemented:

1. A method for wireless communication, comprising: transmitting, by a network node to a wireless device, a first signaling comprising information associated with a first reference signal, wherein the information comprises at least one of a configuration of the first reference signal, an update information of the first reference signal, or a valid period of the first reference signal.

2. A method for wireless communication, comprising: receiving, from a network node by a wireless device, a first signaling comprising information associated with a first reference signal, wherein the information comprises at least one of a configuration of the first reference signal, an update information of the first reference signal, or a valid period of the first reference signal.

3. The method of solution 1 or 2, wherein the wireless device is in a Radio Resource Control (RRC) an idle mode, an RRC inactive mode, or an RRC connected mode.

4. The method of any of solutions 1 to 3, wherein the first signaling comprises at least one of a System Information Block (SIB), a Downlink Control Information (DCI) with a Cyclic Redundancy Check (CRC) scrambled by a Paging Radio Network Temporary Identifier (P-RNTI), or a short message.

4a. The method of solution 4, wherein the SIB comprises at least one of SIB1, SIB2, SIB3 or SIB4.

5. The method of solution 4, wherein the DCI with CRC scrambled by the P-RNTI comprises at least one of a frequency-domain resource assignment information field, a time-domain resource assignment information field, a modulation and coding scheme (MCS) information field, or an information field located after a transport block (TB) scaling factor.

6. The method of solution 5, wherein the DCI comprises a short message, or a code point of a short message indicator comprised in the DCI is "00" or "10".

6a. The method of solution 4, wherein the short message comprises at least one of the third bit through the eighth bit of the short message.

7. The method of any of solutions 1 to 3, wherein the first signaling further comprises a paging occasion (PO) configuration.

8. The method of solution 7, wherein the PO configuration comprises at least one of a grouping information of paging occasions, a time-domain allocation of the PO or a frequency-domain allocation of the PO.

9. The method of any of solutions 1 to 3, wherein the valid period is based on at least one of a periodicity, an offset or a duration.

10. The method of any of solutions 1 to 3, wherein the first reference signal comprises a channel state information reference signal (CSI-RS) for tracking, a CSI-RS for mobility or a CSI-RS for a Layer 1 (L1) reference signal received power (RSRP) computation.

10a. The method of solution 10, wherein the CSI-RS for the L1 RSRP computation comprises a repetition parameter set to on.

10b. The method of solution 10, wherein the CSI-RS for the L1 RSRP computation comprises a CSI-RS resource set with a spatial filter parameter that is identical to a CSI-RS resource.

10c. The method of solution 10, wherein the CSI-RS for the L1 RSRP computation comprises a repetition parameter set to off.

11. The method of any of solutions 1 to 3, wherein a reference signal of a quasi-colocation (QCL) assumption of the first reference signal is a Synchronization Signal/PBCH Block (SSB).

12. The method of any of solutions 1 to 3, wherein the configuration comprises a time-domain configuration.

13. The method of solution 12, wherein the time-domain configuration comprises a periodicity and/or an offset.

13a. The method of solution 13, wherein the periodicity is greater than a periodicity of a Synchronization Signal/PBCH Block (SSB).

13b. The method of solution 13, wherein the periodicity is less than a periodicity of a Synchronization Signal/PBCH Block (SSB).

13c. The method of solution 13, wherein the offset is greater than a threshold.

14. The method of solution 13, wherein the periodicity is less than a threshold.

15. The method of solution 14, wherein the threshold is based on a periodicity of a Synchronization Signal/PBCH Block (SSB), a paging occasion, a paging frame, or discontinuous reception (DRX) cycle.

16. The method of solution 13, wherein the offset is based on a reference point in a time domain associated with a Synchronization Signal/PBCH Block (SSB) burst, a paging occasion (PO), a paging frame (PF), or a discontinuous reception (DRX) cycle.

17. The method of solution 16, wherein the reference point in the time domain associated with the SSB burst comprises at least one of a start or an end of the SSB burst, a start or an end of a half frame comprising a transmission of the SSB burst, or a start or an end of a Primary Synchronization Signal (PSS), a Secondary Synchronization Signal (SSS), a Physical Broadcast Channel (PBCH) or a Demodulation Reference Signal (DM-RS) associated with the PBCH.

18. The method of solution 16, wherein the reference point in the time domain associated with the PO comprises at least one of a start or an end of the PO, a start or an end of a first Physical Downlink Control Channel (PDCCH) monitoring occasion of the PO, or a start or an end of a last PDCCH monitoring occasion of the PO.

19. The method of solution 16, wherein the reference point in the time domain associated with the PF comprises at least a start or an end of the PF.

20. The method of solution 16, wherein the reference point in the time domain associated with the DRX cycle comprises at least a start or an end of the DRX cycle.

21. The method of solution 13, wherein the periodicity of the first reference signal comprises one or more Synchronization Signal/PBCH Block (SSB) bursts, a paging occasion (PO), a paging frame (PF), or a discontinuous reception (DRX) cycle.

22. The method of solution 21, wherein gaps of an adjacent first reference signal within the periodicity are identical.

23. The method of any one of solutions 1 to 3, wherein the configuration comprises a frequency-domain configuration.

24. The method of solution 23, wherein the frequency-domain configuration comprises an indication of a number of physical resource blocks (PRBs) and/or an offset.

25. The method of solution 24, wherein the offset is based on a second reference signal or a second resource block.

26. The method of solution 20, wherein the second reference signal comprises at least one of a Synchronization Signal/PBCH Block (SSB), a primary synchronization signal (PSS), a secondary synchronization signal (SSS), a physical broadcast channel (PBCH), or a demodulation reference signal (DM-RS) associated with the PBCH.

27. The method of solution 20, wherein the second resource block comprises a control resource set (CORESET) associated with a paging search space or CORESET 0.

28. The method of any of solutions 1 to 3, wherein the configuration of the first reference signal in the first signaling has higher priority than the configuration in a Radio Resource Control (RRC) signal.

29. The method of solution 10, wherein the first reference signal is used for a radio resource management (RRM) measurement, a cell selection, or a cell re-selection.

30. The method of solution 29, wherein a criterion of the cell selection or the cell re-selection for a Synchronization Signal/PBCH Block (SSB) and the first reference signal is separately configured.

31. The method of solution 30, wherein the criterion of the cell selection or the cell re-selection is fulfilled when a measurement result of the SSB or a measurement result of the first reference signal meets the criterion.

32. The method of solution 10, wherein the first reference signal corresponds to a Physical Downlink Control Channel (PDCCH) monitoring occasion for paging within a paging occasion (PO).

33. A wireless communications apparatus comprising a processor and a memory, wherein the processor is configured to read code from the memory and implement a method recited in any of solutions 1 to 32.

34. A computer program product comprising a computer-readable program medium code stored thereupon, the code, when executed by a processor, causing the processor to implement a method recited in any of solutions 1 to 32.

Figure 11:
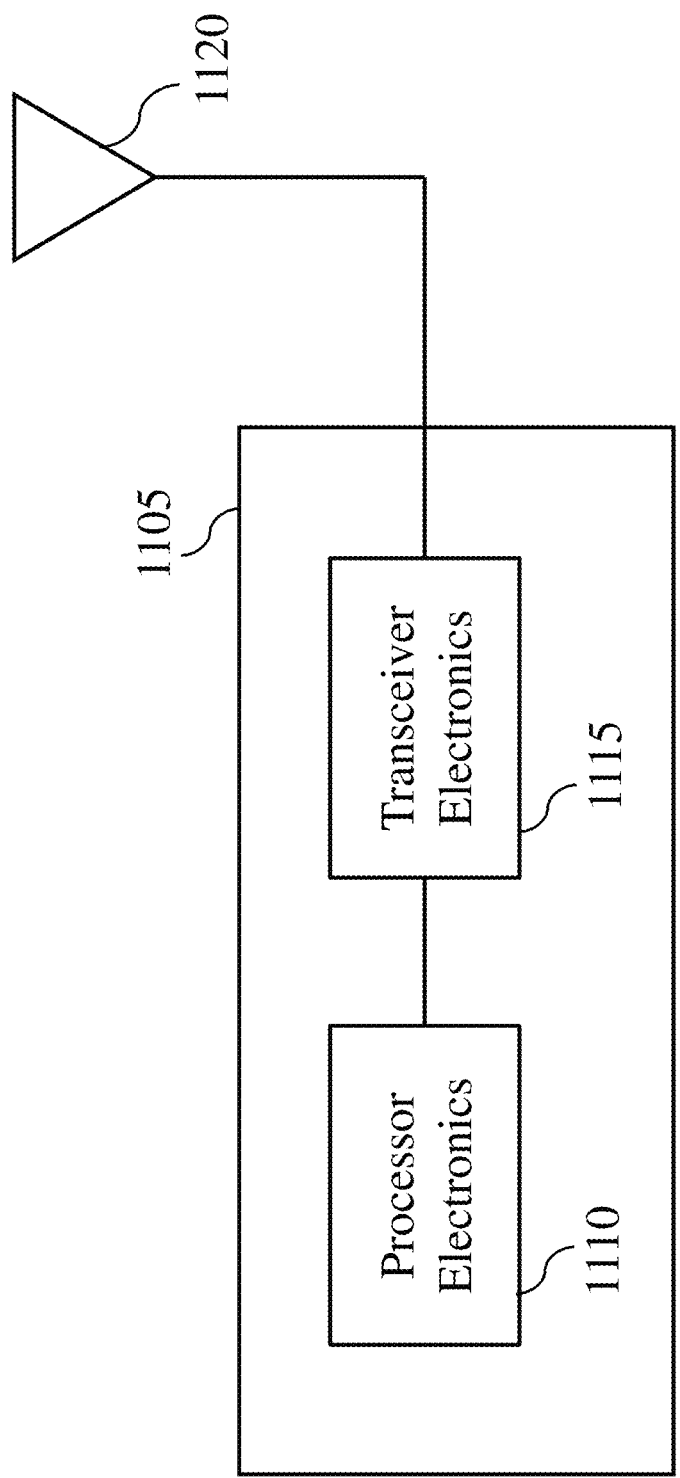
FIG. 11 is a block diagram representation of a portion of an apparatus that can be configured to implement one or more methods described in the present document.

FIG. 11 is a block diagram representation of a portion of an apparatus, in accordance with some embodiments of the presently disclosed technology. An apparatus 1105, such as a base station or a wireless device (or UE), can include processor electronics 1110 such as a microprocessor that implements one or more of the techniques presented in this document. The apparatus 1105 can include transceiver electronics 1115 to send and/or receive wireless signals over one or more communication interfaces such as antenna(s) 1120. The apparatus 1105 can include other communication interfaces for transmitting and receiving data. Apparatus 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions are implemented using the apparatus 1105.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
   receiving, by a wireless device from a network node, information in a System Information Block (SIB) message indicating a periodicity and an offset of a first reference signal that is configured for tracking, a value indicating a starting physical resource block (PRB) of the first reference signal with respect to a common resource block 0, a number of PRBs for the first reference signal, and a ratio of an Energy Per Resource Element (EPRE) of the first reference signal to the EPRE of a secondary synchronization signal (SSS);
   receiving, by the wireless device when the wireless device is in a Radio Resource Control (RRC) idle mode or an RRC inactive mode, a signaling message from the network node, the signaling message indicating configuration information of the first reference signal configured for tracking, wherein a resource type of the first reference signal is periodic,
   wherein the signaling message is a Downlink Control Information (DCI) signaling message with Cyclic Redundancy Check (CRC) scrambled by a Paging Radio Network Temporary Identifier (P-RNTI), the DCI signaling message including an indicator field having one or more bits indicating an update of an availability of the first reference signal regarding whether the first reference signal is valid or not, wherein the indicator field is located after a transport block TB scaling factor carried by the DCI signaling message; and
   performing, by the wireless device, an operation based on the configuration information of the first reference signal.

2. The method of claim 1, wherein the first reference signal comprises a channel state information reference signal (CSI-RS).

3. A method for wireless communication, comprising:
   transmitting, by a network node, information to a wireless device in a System Information Block (SIB) message indicating a periodicity and an offset of a first reference signal configured for tracking, a value indicating a starting physical resource block (PRB) of the first reference signal with respect to a common resource block 0, a number of PRBs for the first reference signal, and a ratio of an Energy Per Resource Element (EPRE) of the first reference signal to the EPRE of a secondary synchronization signal (SSS).
   transmitting, by the network node, a signaling message to the wireless device when the wireless device is in a Radio Resource Control (RRC) idle mode or an RRC inactive mode to enable the wireless device to perform an operation based on the signaling message,
   wherein the signaling message indicates configuration information of the first reference signal configured for tracking, wherein a resource type of the first reference signal is periodic, and
   wherein the signaling message is a Downlink Control Information (DCI) signaling message with Cyclic Redundancy Check (CRC) scrambled by a Paging Radio Network Temporary Identifier (P-RNTI), the DCI signaling message including an indicator field having one or more bits indicating an update of an availability of the first reference signal regarding whether the first reference signal is valid or not, wherein the indicator field is located after a transport block TB scaling factor carried by the DCI signaling message.

4. The method of claim 3, wherein the first reference signal comprises a channel state information reference signal (CSI-RS).

5. A device for wireless communication, comprising at least one processor that is configured to:
   receive information a System Information Block (SIB) message indicating a periodicity and an offset of a first reference signal configured for tracking, a value indicating a starting physical resource block (PRB) of the first reference signal with respect to a common resource block 0, a number of PRBs for the first reference signal, and a ratio of an Energy Per Resource Element (EPRE) of the first reference signal to the EPRE of a secondary synchronization signal (SSS);
   receive, when the device is in a Radio Resource Control (RRC) an idle mode or an RRC inactive mode, a signaling message from a network node, the signaling message indicating configuration information of the first reference signal configured for tracking, wherein a resource type of the first reference signal is periodic,
   wherein the signaling message is a Downlink Control Information (DCI) signaling message with Cyclic Redundancy Check (CRC) scrambled by a Paging Radio Network Temporary Identifier (P-RNTI), the DCI signaling message including an indicator field having one or more bits indicating an update of an availability of the first reference signal regarding whether the first reference signal is valid or not, wherein the indicator field is located after a transport block TB scaling factor carried by the DCI signaling message; and
   perform an operation based on the configuration information of the first reference signal.

6. The device of claim 5, wherein the first reference signal comprises a channel state information reference signal (CSI-RS).

7. A device for wireless communication, comprising at least one processor that is configured to:
   transmit information to a wireless device in a System Information Block (SIB) message indicating a periodicity and an offset of a first reference signal configured for tracking, a value indicating a starting physical resource block (PRB) with respect to a common resource block 0, a number of PRBs, and and a ratio of an Energy Per Resource Element (EPRE) of the first reference signal to the EPRE of a secondary synchronization signal (SSS)
   transmit a signaling message to a wireless device when the wireless device is in a Radio Resource Control (RRC) idle mode or an RRC inactive mode to enable the wireless device to perform an operation based on the signaling message,
   wherein the signaling message indicates configuration information of the first reference signal configured for tracking, wherein a resource type of the first reference signal is periodic, and
   wherein the signaling message is a Downlink Control Information (DCI) signaling message with Cyclic Redundancy Check (CRC) scrambled by a Paging Radio Network Temporary Identifier (P-RNTI), the DCI signaling message including an indicator field having one or more bits indicating an update of an availability of the first reference signal regarding whether the first reference signal is valid or not, wherein the indicator field is located after a transport block TB scaling factor carried by the DCI signaling message.

8. The device of claim 7, wherein the first reference signal comprises a channel state information reference signal (CSI-RS).

9. The method of claim 1, wherein a reference signal satisfying a quasi-colocation (QCL) assumption with the first reference signal is a Synchronization Signal Block (SSB).

10. The method of claim 3, wherein a reference signal satisfying a quasi-colocation (QCL) assumption with the first reference signal is a Synchronization Signal Block (SSB).

11. The device of claim 5, wherein a reference signal satisfying a quasi-colocation (QCL) assumption with the first reference signal is a Synchronization Signal Block (SSB).

12. The device of claim 7, wherein a reference signal satisfying a quasi-colocation (QCL) assumption with the first reference signal is a Synchronization Signal Block (SSB).

* * * * *